Jan. 27, 1959     O. M. HART     2,871,440

IMPROVED WELDING UNIT

Filed Sept. 21, 1955     2 Sheets-Sheet 1

INVENTOR.
OLIVER M. HART
BY
*Shoemaker & Mattare*
ATTORNEYS

Jan. 27, 1959
O. M. HART
2,871,440
IMPROVED WELDING UNIT
Filed Sept. 21, 1955
2 Sheets-Sheet 2
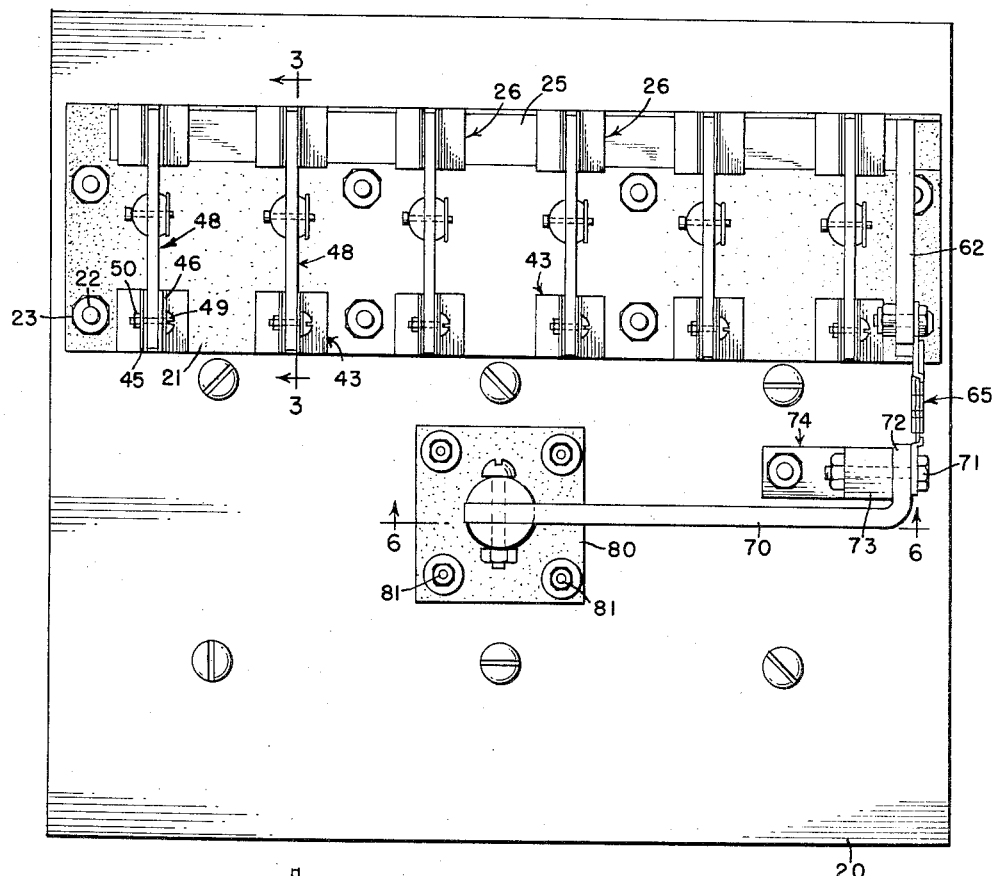
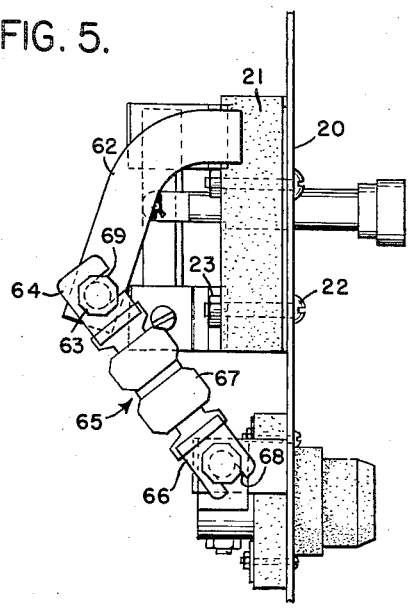
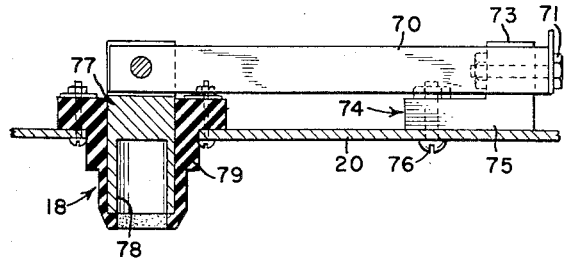
INVENTOR.
OLIVER M. HART
BY
Shoemaker & Mattare
ATTORNEYS United States Patent Office 2,871,440
Patented Jan. 27, 1959

2,871,440

IMPROVED WELDING UNIT

Oliver M. Hart, West Cornwall, Conn.

Application September 21, 1955, Serial No. 535,560

6 Claims. (Cl. 323—74)

This invention relates generally to improvements in a welding unit such as that illustrated in Patent No. 2,680,255 and pertains more particularly to improvements in the switching circuit therefor.

A primary object of this invention is to provide an improved switching assembly particularly adapted for use with a six-man welding unit whereby to provide a safe and waterproof mechanism.

Another object of this invention is to provide an improved switching assembly for the purpose described wherein the front portion of one of the drawers of the welding unit has rigidly secured to its rear surface an elongate block of insulating material which provides at once a support for the switches and a guide for the plunger operators therefor, the insulating material, of course, serving to properly insulate the switches from the material forming the drawer.

Another object of this invention is to provide an improved switching unit including an elongate block of insulating material having a bus bar recessed therewithin to which are electrically connected a series of spaced contact members, there being an opening through the insulating material below each contact member for the guided reception therethrough of plunger members for operating the switches whereby the switching mechanism will be sealed from exterior moisture to the greatest extent.

Another object of this invention is to provide a switching assembly in conformity with the preceding objects wherein the insulating block has formed integrally therewith and on one face thereof a series of spaced pads or feet which are engaged against the inner surface of the drawer front to space the insulating block slightly therefrom whereby to provide a drain-off space for any moisture collecting on the actuating plunger externally of the drawer.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be restored to without departing from the spirit or sacrificing any of the advantages of the invention.

In the drawings:

Fig. 2 is an elevational view of the rear face of the drawer front;

Fig. 5 is an end view of the drawer front; and

Fig. 6 is a sectional view taken substantially along the plane of section line 6—6 of Fig. 2.

Figure 1:
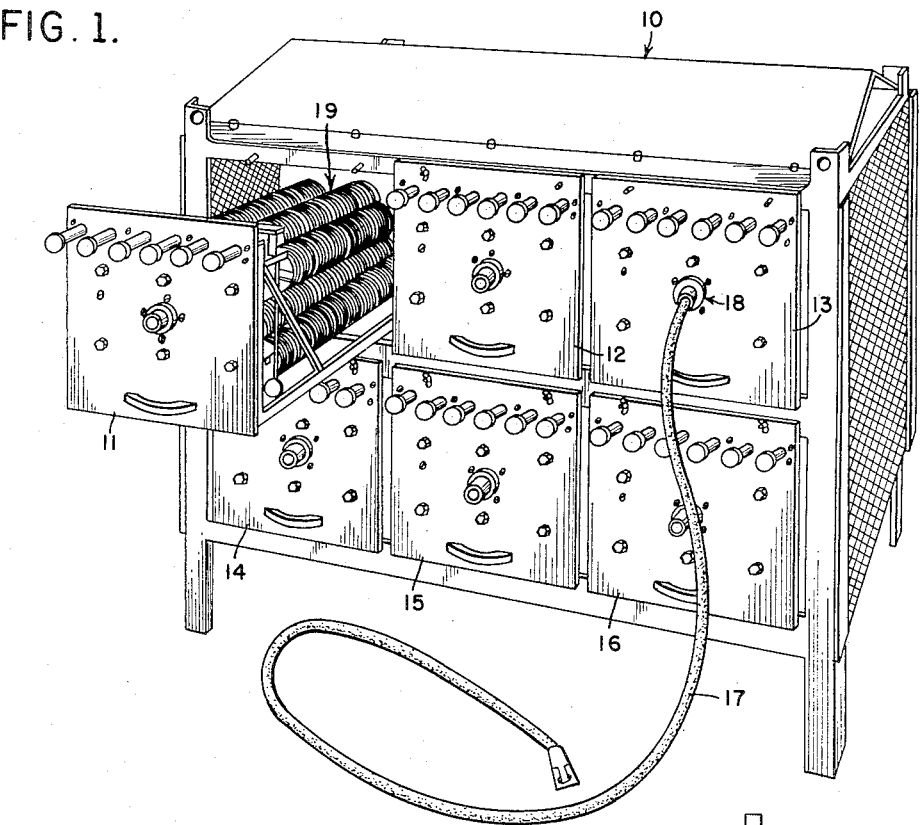
Fig. 1 is a perspective view showing the welding unit with which this invention is particularly adapted for use.

Referring at this time more particularly to Fig. 1, the reference numeral 10 indicates generally the welding unit for which this invention is particularly adapted. The construction of the welding unit 10 is generally in accordance with the disclosure of Patent No. 2,680,255 and includes a plurality of removable drawer members 11, 12, 13, 14, 15 and 16, each of which is so designed as to accommodate one worker. There is a common current feed-in, not shown, for supplying the necessary electrical current for welding and each of the drawer assemblies is adapted to have associated therewith a current take-off conductor 17, only one of which is shown in Fig. 1, there being provided a jack 18 in each of the drawer assemblies for connection with the take-off 17. With the particular assembly shown in Fig. 1, welding current can be supplied simultaneously to six men, as will be seen. Furthermore, each unit or drawer is provided with a series of switches hereinafter described, which coperate with the resistor elements indicated generally by the reference character 19 in Fig. 1 for supplying various amounts of current through the take-off conductor 17. In this manner, each individual welder can control the current or "heat" for his own particular welding purposes, the mode of operation being the same as set forth in the aforementioned Patent 2,680,255. However, the individual switches are constructed differently from the aforementioned patent, as will be seen most clearly from Figs. 2-4. Each of the drawer assemblies includes a front plate portion 20 and rigidly secured on the back face of each of these fronts is an elongate block of insulating material 21, this material being preferably formed of relatively hard rubber. A series of fasteners are provided for securely attaching the insulating block to the drawer front 20. As shown specifically in Fig. 2, these fasteners are of the screw 22 and nut 23 type, preferably, and are arranged in two parallel rows, as shown. The insulating block is formed with an elongate trough or recess 24 and disposed therewithin is an elongate bus bar member 25 which serves as a common mounting means and electrical conductor for one contact member of each of the several switches utilized. One of the contacts which is secured to the bus bar is illustrated most clearly in Fig. 4, this contact being indicated generally by the reference character 26. The contact 26 will be seen to include a flat base portion 27, having right angularly bent portions 28 and 29 at opposite sides thereof and integral therewith, which portions are then bent inwardly in the portions 30 and 31 and then in parallel relation to provide the knife contacting leg portions 32 and 33, such leg portions terminating in the outwardly flared edge portions 34 and 35. The base 27 is secured directly to the bus bar 25 in each instance, the manner of attachment preferably being by a screw 36 which projects through the insulating block, the bus bar and the base 27 and is provided with screw threaded engagement on its free end with a nut member 37, as will be apparent.

Preferably, the headed end 38 of the screw 36 is disposed within a suitable recess 39 in the front face 40 of the insulating block so as to positively assure that the screw will not at any time contact the metallic front 20 of the drawer and thus cause a short circuit or present a hazard to the workman.

The front surface 40 of the insulating block is provided with a plurality of spaced pads or feet 41 which protrude therefrom and bear against the rear surface of the drawer front 20 to space the insulating block surface 40 from the adjacent surface of the drawer front 20 and thereby provide a space 42 therebetween.

Figure 3:
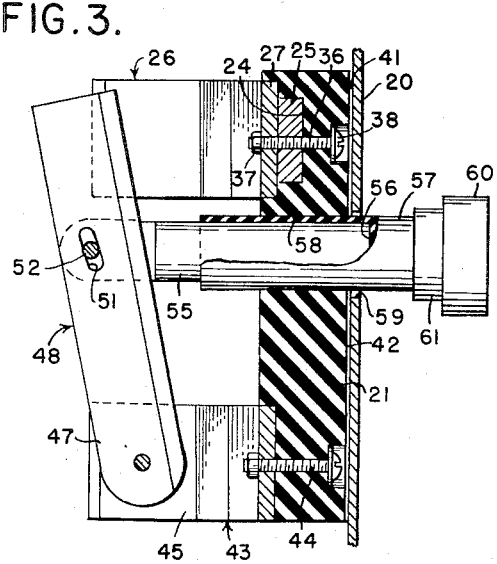
Fig. 3 is an enlarged vertical section taken substantially along the plane of section line 3—3 of Fig. 2.
Figure 4:
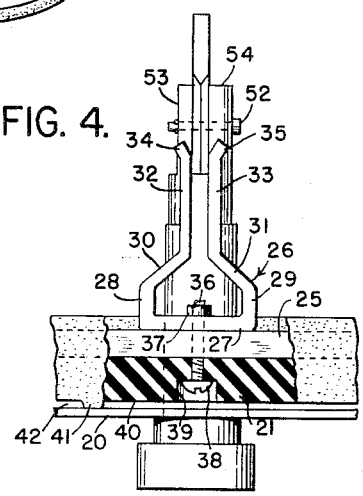
Fig. 4 is a top plan view of the assembly shown in Fig. 3 with portions thereof broken away to show details of internal construction.

As will be seen most clearly in Fig. 3, there is associated with each contact 26 a base contact member 43 which is constructed substantially identically to the aforementioned contact 26, the screw 44 serving to anchor each of the contacts 43 in place. However, the contacts 43 have no common electrical conductor so that each is mounted in insulated relation to the other. Between the leg portions 45 and 46 of each contact 43 is disposed the end portion 47 of a knife blade switch member indicated generally by the reference character 48. The switch blade is pivotally mounted between the legs 44 and 45 by means of the screw member 49 which projects through the legs and the blade and is retained in position as by a nut 50, or other suitable means may be provided for rotatably securing the switch blade between the contact legs. As will be seen most clearly in Fig. 3, the blade 48 of each vertically associated pair of contacts 26 and 43 is of sufficient length as to bridge between such contacts upon manipulation of the switch. Each blade is provided with a longitudinally elongate slot 51 which has projected therethrough a pin member 52, which pin member in turn is carried by the legs 53 and 54 which are formed by bifurcating the end portion of a metallic plunger member 55. The plunger 55 is received for the most part within the recess or socket 56 of an elongate outer plunger member 57 which is formed of insulating material and which projects through and is snugly received within an associated bore or aperture 58 through the insulating block, there being, of course, provided one such aperture and plunger assembly for each switch blade. The drawer front 20 is provided with an enlarged aperture 59 in register with each of the bores 58 and the outer plunger 57 terminates exteriorly of the drawer front in an enlarged head portion 60 and immediately behind such head portion in a shoulder portion 61, which is of greater external diameter than the inner diameter of the associated opening 59 in the drawer front. As will be readily apparent, the outer insulating plunger 57 is reciprocable through its associated bore 58 in the insulating block 21 and the close contact therebetween serves to prevent any moisture which may collect on the plunger exteriorly of the drawer from reaching the switch mechanisms. Should any moisture contact the plunger 57 it will be wiped off the same as the plunger is manipulated inwardly through the insulating block and any such moisture may then drip downwardly by virtue of the spacing 42 between the insulating block and the drawer front, as occasioned by the previously mentioned feet or pads 41.

If desired, the plunger 57 may be coated with suitable material whereby it will more readily tend to shed or prevent the collection of moisture thereon. The insulating block serves as the sole means of support for the plunger 57 and absolutely prevents the introduction of moisture into the interior of the drawer during manipulation of the plungers and their associated switches. It is preferred that the feet 41 which serve to space the insulating block from the drawer front 20 be in rib-like form so as to extend vertically the entire width of the insulating block, thus in effect dividing the space 42 into a series of individual spaces and in effect isolating the various switches from each other.

One end of the bus bar 25 terminates in a laterally bent, downwardly angulated arm portion 62, as will be seen most clearly in Figs. 2 and 5. This arm terminates in rearwardly spaced relation from the insulating block 21 and has projected therethrough a bolt and nut assembly 63 by means of which the notched terminal member 64 is rigidly secured thereto. The terminal member 64 forms part of a fuse assembly, indicated generally by the reference character 65 and it will be seen that this fuse assembly includes the previously mentioned terminal member 64, a second terminal member 66 and a fusible element 67 joining such terminals. The terminal member 66 is also notched, although from one end thereof as indicated by the reference character 68 rather than from the side as indicated by the reference character 69, as is the case with the terminal member 64. A secondary bus bar 70, see particularly Figs. 2 and 6, is electrically connected and secured to the terminal member 66 by means of a bolt and nut assembly 71, which bolt and nut assembly not only projects through the notch 68 and the laterally bent end portion 72 of the secondary bus bar, but through an outstanding leg portion 73 of an insulating block member indicated generally by the reference character 74. The insulating block is of generally L-shaped configuration and the leg 75 thereof is engaged against the rear surface of the drawer front 20 and secured thereto as by the fastener 76.

The previously mentioned jack assembly 18 associated with each drawer includes a metallic core portion 77 having the jack opening 78 therein, the core being surrounded by an insulating shell 79 which has a substantially rectangular base portion 80 secured as by fasteners 81 in abutting relation to the inner surface of the drawer front 20 with the jack assembly projecting therethrough, as will be seen most clearly in Fig. 6.

The specific mounting for the fuse assembly 65 as shown is particularly advantageous in preventing unwarranted break-down thereof due to fracture. During service the fuse assembly, of course, becomes heated to some extent and the elongation and contraction caused by the heating and cooling of the fuse assembly during service is compensated for by the specific mounting thereof, as shown. Since the bus bar 25 is supported solely by the insulating block 21 and since this insulating block is of hard rubber which is somewhat flexible, it will be appreciated that a slight rocking movement of the bus bar is permitted, which is sufficient to accommodate for the elongation and contraction of the fuse member without imparting undue stress thereto.

I claim:

1. In a multiple welding unit including a cabinet having a plurality of removable drawers therein, an electrical outlet on each drawer, a plurality of resistor units carried by each drawer having electrical connection with a source of current, and a multiple switch assembly including a plurality of switches for individual electrical connection of said resistor units in different combinations to said outlet whereby to selectively control the magnitude of welding current available to said outlet, said switch assembly including an elongate block of flexible insulating material mounted upon the inner face of its associated drawer front, said elongate block having a front face disposed adjacent the inner face of the associated drawer front and having an oppositely disposed rear face, said insulating block having an elongated cavity formed therein, an elongate bus bar embedded within said cavity, each of said switches including a first contact secured to the bus bar and projecting rearwardly from the rear face of said insulating block, a second contact secured to said rear face of the insulating block and projecting rearwardly therefrom, a blade pivotally carried by one contact for oscillation into and out of engagement with the other contact, an actuating plunger secured to the blade rearwardly of said rear face of the insulating block, said plunger projecting through said block and said drawer front and extending forwardly thereof, said plunger being slidably but snugly supported only by said insulating block to prevent the transfer of moisture on said plunger through the insulating block when the plunger is moved rearwardly.

2. In a multiple welding unit including a cabinet having a plurality of removable drawers therein, an electrical outlet on each drawer, a plurality of resistor units carried by each drawer having electrical connection with a source of current, and a multiple switch assembly including a plurality of switches for individual electrical connection of said resistor units in different combinations to said outlet whereby to selectively control the magnitude of welding current available to said outlet, said switch assembly including an elongate block of flexible insulating material mounted upon the inner face of its associated drawer front, said elongate block having a front face disposed adjacent the inner face of the associated drawer front and having an oppositely disposed rear face, said rear face having a longitudinally extending trough formed therein, an elongate bus bar disposed within said trough, each of said switches including a pair of contact members one of which is secured to said bus bar and the other of which is secured in spaced relation thereto on said rear face of the insulating block, each of said contacts projecting laterally from said rear face, said insulating block having an opening therethrough disposed between said contacts, said drawer front having an opening in alignment with but larger than each opening in the insulating block, a plunger of insulative material snugly but slidably received in each of said insulating block openings, a switch blade pivoted to one of each pair of contacts, and each plunger being connected to a corresponding switch blade rearwardly of said rear face for swinging the switch blades into and out of contact with the other of each pair of contacts.

3. The welding unit according to claim 1 wherein the front face of said insulating block is provided with spaced pads for engaging the inner face of the associated drawer front for spacing said inner face from the front face of said insulating block.

4. The welding unit according to claim 2 wherein the front face of said insulating block is provided with a series of spaced vertically extending ribs engaging the inner face of the drawer front for spacing said inner face from the front face of said insulating block to form drip spaces between said last mentioned faces.

5. In a multiple welding unit including a cabinet having a plurality of removable drawers therein, an electrical outlet on each drawer, a plurality of resistor units carried by each drawer having electrical connection with a source of current, and a multiple switch assembly including a plurality of switches for individual electrical connection of said resistor units in different combinations to said outlet whereby to selectively control the magnitude of welding current available to said outlet, said switch assembly including an elongate block of flexible insulating material mounted upon the inner face of its associated drawer front, said elongate block having a front face disposed adjacent the inner face of the associated drawer front and having an oppositely disposed rear face, an elongate bus bar embedded within said insulating block adjacent said rear face, each of said switches including a first contact secured to the bus bar and a second contact secured to the rear face of said insulating block, a blade pivotally carried by one contact for oscillation into and out of engagement with the other contact, an actuating plunger secured to the blade rearwardly of said rear face and projecting through said block and said drawer front, said plunger being slidably but snugly supported only by said insulating block to prevent the transfer of moisture on said plunger through the insulating block when said plunger is moved in a rearward direction, said bus bar having a laterally projecting arm at one end thereof, a fuse member rigidly secured at opposite ends to said arm and said electrical outlet with the flexibility of said insulating block accommodating expansion and contraction of the fuse element.

6. In a multiple welding unit including a cabinet having a plurality of removable drawers therein, an electrical outlet on each drawer, a plurality of resistor units carried by each drawer having electrical connection with a source of current, and a multiple switch assembly including a plurality of switches for individual electrical connection of said resistor units in different combinations to said outlet whereby to selectively control the magnitude of welding current available to said outlet, said switch assembly including an elongate block of flexible insulating material mounted upon the inner face of its associated drawer front, an elongate bus bar embedded within said insulating block adjacent the rear face thereof, said bus bar having a downwardly and rearwardly extending arm at one end thereof, a fuse member rigidly secured at opposite ends to said arm and said electrical outlet whereby the flexibility of said insulating block permits rocking of said bus bar for accommodating expansion and contraction of the fuse element.

References Cited in the file of this patent

UNITED STATES PATENTS

| | | |
|---|---|---|
| 1,075,986 | McElroy | Oct. 14, 1913 |
| 1,357,762 | Burns | Nov. 2, 1920 |
| 1,480,193 | Wyman | Jan. 8, 1924 |
| 1,778,676 | Kempton | Oct. 14, 1930 |
| 1,915,709 | Wiseman | June 27, 1933 |
| 2,104,689 | Barker | Jan. 4, 1938 |
| 2,390,585 | Hartley | Dec. 11, 1945 |
| 2,544,761 | Kilminster | Mar. 13, 1951 |
| 2,632,039 | Hammerly | Mar. 17, 1953 |
| 2,680,225 | Stevens | June 1, 1954 |
| 2,718,570 | Caldwell | Sept. 20, 1955 |

FOREIGN PATENTS

| | | |
|---|---|---|
| 428,930 | Great Britain | May 13, 1935 |